United States Patent [19]

Martin et al.

[11] Patent Number: 5,575,106
[45] Date of Patent: Nov. 19, 1996

[54] IN SITU MICROWAVE INSECT ERADICATION DEVICE WITH SAFETY SYSTEM

[75] Inventors: Randy S. Martin; Paul R. Biederman; Michael R. Meek, all of Santa Clara, Calif.

[73] Assignee: Micro Term, Inc., San Jose, Calif.

[21] Appl. No.: 349,090

[22] Filed: Dec. 2, 1994

[51] Int. Cl.[6] ................................................. A01M 1/20
[52] U.S. Cl. ............................................. 43/132.1; 43/124
[58] Field of Search ................................... 43/124, 132.1

[56] References Cited

U.S. PATENT DOCUMENTS

| | | | |
|---|---|---|---|
| 4,370,534 | 1/1983 | Brandon | 43/124 |
| 5,058,313 | 10/1991 | Tallon | 43/132.1 |
| 5,192,545 | 3/1993 | Nakashima | 424/405 |
| 5,468,938 | 11/1995 | Roy | 219/690 |

FOREIGN PATENT DOCUMENTS 3804052  8/1989  Germany.

*Primary Examiner*—Kurt Rowan
*Attorney, Agent, or Firm*—Michael J. Hughes; Bradley T. Sako

[57] ABSTRACT

An in situ microwave insect eradication system (10) has a remotely deployed movable horn array subassembly (12), a proximity detector subsystem (14), a local control unit (16), and an energy absorbent backdrop (20). The horn array subassembly (12) can deploy a number of microwave horn units (32) in both horizontal or vertical arrays. The microwave horn units (32) are controlled by the local control unit (16) which determines the order, duration, and repetition of energy emitted. The proximity detector subsystem can immediately shut down the eradication system (10) upon detecting a body, such a human or pet. The backdrop (20) is deployed opposite the horn array subassembly (12) to absorb residual microwave energy.

17 Claims, 8 Drawing Sheets

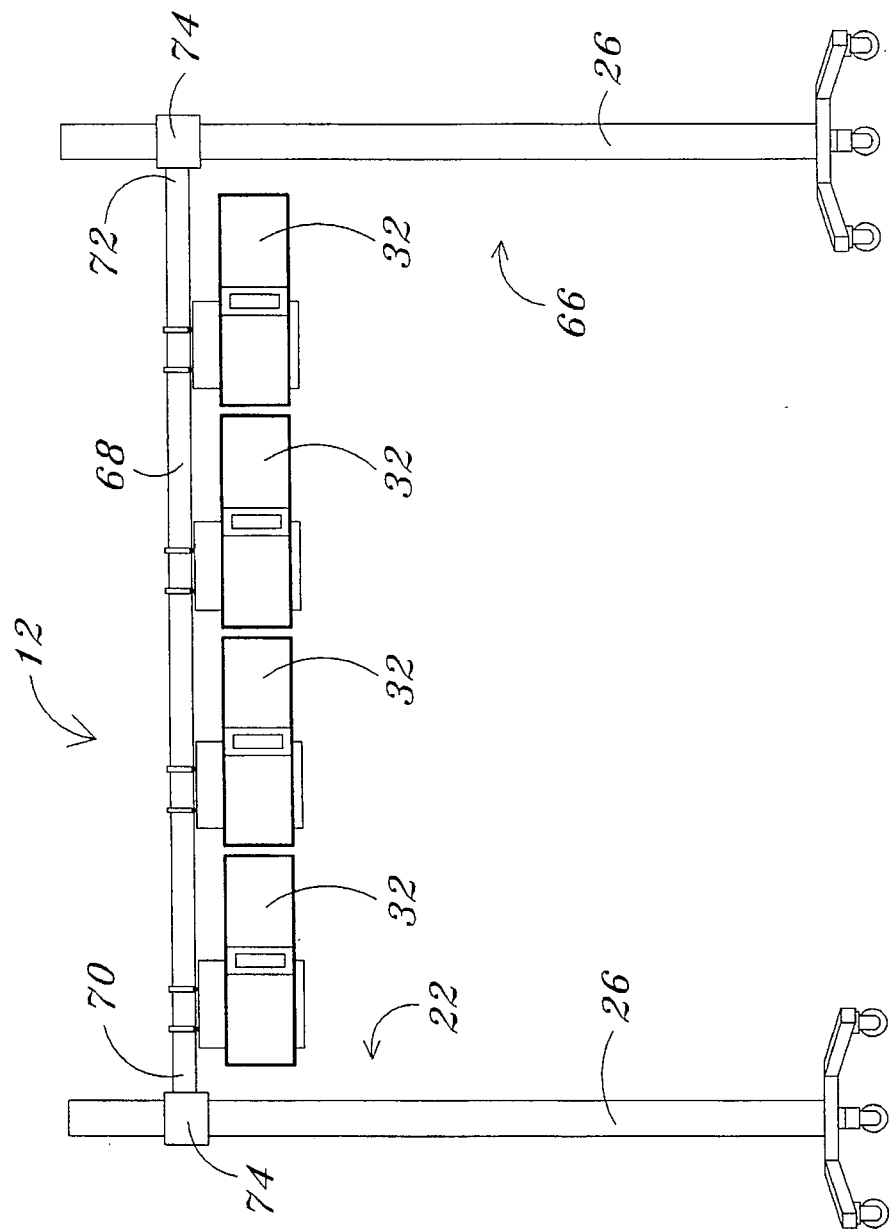

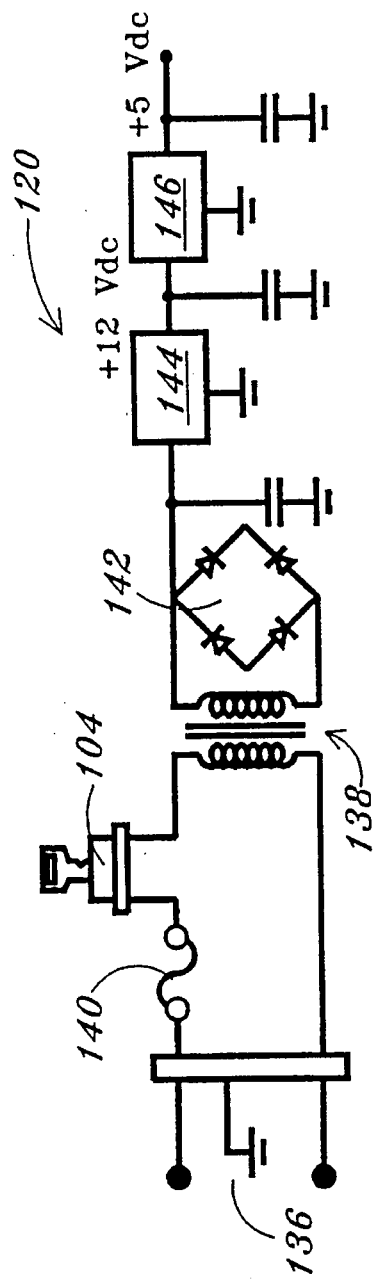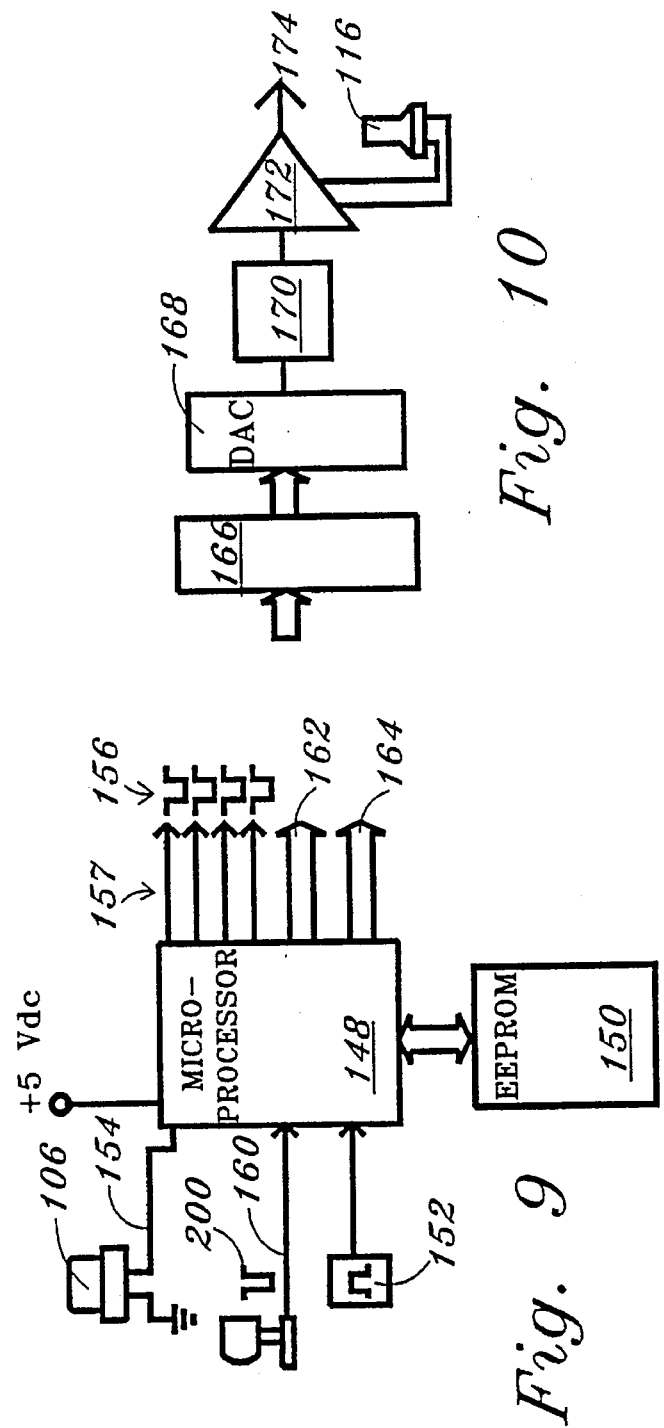
Fig. 8
Fig. 9
Fig. 10

5,575,106

IN SITU MICROWAVE INSECT ERADICATION DEVICE WITH SAFETY SYSTEM

TECHNICAL FIELD

The present invention relates generally to the fields of microwave energy emission and pest control systems, and more particularly to a system for eradicating termites using microwave energy.

BACKGROUND ART

Few events can be more distressing for a homeowner than the discovery of termite infestation. Unchecked, these wood consuming pests can completely destroy the structural integrity of a dwelling. As a result, a plethora of termite extermination devices, compounds, and methods have evolved over time.

While chemical approaches have proven effective, these methods have drawbacks, however, often using powerful insecticides that can require the displacement of residents over a considerable time period and have considerable impact on the environment.

There also exist a number of non-toxic methods such as that set forth in U.S. Pat. No. 5,192,545 issued to Yoshito Nakashima. The material presented by this patent requires accessing hard to reach places, and so can be very time consuming and labor intensive.

Like the present invention, German Patent No. DE3804052 held by Robert Bosch GmbH, utilizes microwave energy to kill plants and garden pests. The invention includes a microwave transmitter that is housed in a number of different assemblies, including a number of hand pushed carts, hand held units, a drawer and a conveyor belt. The drawbacks of the design is that it does not cover a wide area, is not automated, programmable, and does not possess any substantial safety features.

To the inventors' knowledge, no insect eradication system using microwave energy has been developed that provides a programmable, automated system having a variety of safety features that is capable of treating large objects and/or areas.

DISCLOSURE OF INVENTION

Accordingly, it is an object of the present invention to provide a microwave termite eradication system that includes a remotely located control unit.

It is another object of the present invention to provide a microwave termite eradication system with emission horns that include local power supplies.

It is still another object of the present invention to provide a microwave termite eradication system with an array of microwave horns.

It is yet another object of the present invention to provide a microwave termite eradication system with a mobile array of microwave horns.

It is still another object of the present invention to provide a microwave termite eradication system with at least one proximity sensor.

It is yet another object of the present invention to provide a microwave termite eradication system with a control unit having improved safety features.

It is yet another object of the present invention to provide a microwave termite eradication system with portable energy absorbing backdrop.

Briefly, the preferred embodiment of the present invention is an in situ microwave insect eradication system including a microwave horn array having a number of microwave horns positioned in a row. In the preferred embodiment, each microwave horn includes a magnetron for emitting microwave energy and a remotely controllable magnetron power supply. The magnetron power supply includes a transformer for stepping up common line voltage to power the associated magnetron.

The microwave horns can be mounted either horizontally or vertically according to the structure sought to be treated. For a vertical orientation the microwave horns are mounted on a first rolling pole, having a first base with a number of wheels and an upwardly projecting pole. For a horizontal orientation, a bar is connected horizontally between the first rolling pole and a second rolling pole. The microwave horns are then attached to the bar. A local control unit is connected to the microwave horns and includes circuitry for emmitting the microwave horns off and on. In the preferred embodiment, the local control unit is microprocessor controlled, and has a number of built in safety features, including a key switch which provides power to the local control unit, and a contact delay time switch that must be depressed for ten seconds in order to activate the microwave horns. In addition, the local control unit includes articulated audio and a display for the various functions of the eradication system. Unlike the microwave horns, the local control unit is powered by low voltage.

Additional safety features of the preferred embodiment are provided by one or more proximity sensors positioned proximate to each array of microwave horns. If the proximity sensor detects a body (i.e. person, or animal), the sensor sends a signal to the local control unit which automatically shuts off the array of microwave horns.

The preferred embodiment also employs an energy absorbing backdrop positioned behind the microwave horn array and the targeted object. The backdrop absorbs excess emitted energy.

An advantage of the present invention is that it provides an eradication system with a local, low voltage control unit for controlling a number of remote, high voltage microwave horns.

A further advantage of the present invention is that it provides an eradication system that can be moved quickly between locations.

Yet another advantage of the present invention is that it provides an eradication system with microwave horn arrays that can be quickly and easily deployed between a horizontal and vertical orientation.

Still another advantage of the present invention is that it provides an eradication system with a start button that requires ten seconds of contact to activate.

Yet another advantage of the present invention is that it provides an eradication system with a keylock switch.

Still another advantage of the present invention is that is provides an eradication system with a local control unit with low voltage components.

These and other objects and advantages of the present invention will become clear to those skilled in the art in view of the description of the best presently known mode of carrying out the invention and the industrial applicability of the preferred embodiment as described herein and as illustrated in the several figures of the drawing.

BRIEF DESCRIPTION OF THE DRAWINGS

FIG. 5 is a front view of the horn array subassembly with a horizontal array of microwave horn units of the preferred embodiment;

FIG. 8 is a schematic diagram of the power circuit of the preferred embodiment;

FIG. 9 is a block schematic diagram of the control circuit of the preferred embodiment;

FIG. 10 is a block schematic diagram of the speech circuit of the preferred embodiment.

BEST MODE FOR CARRYING OUT INVENTION

Figure 1:
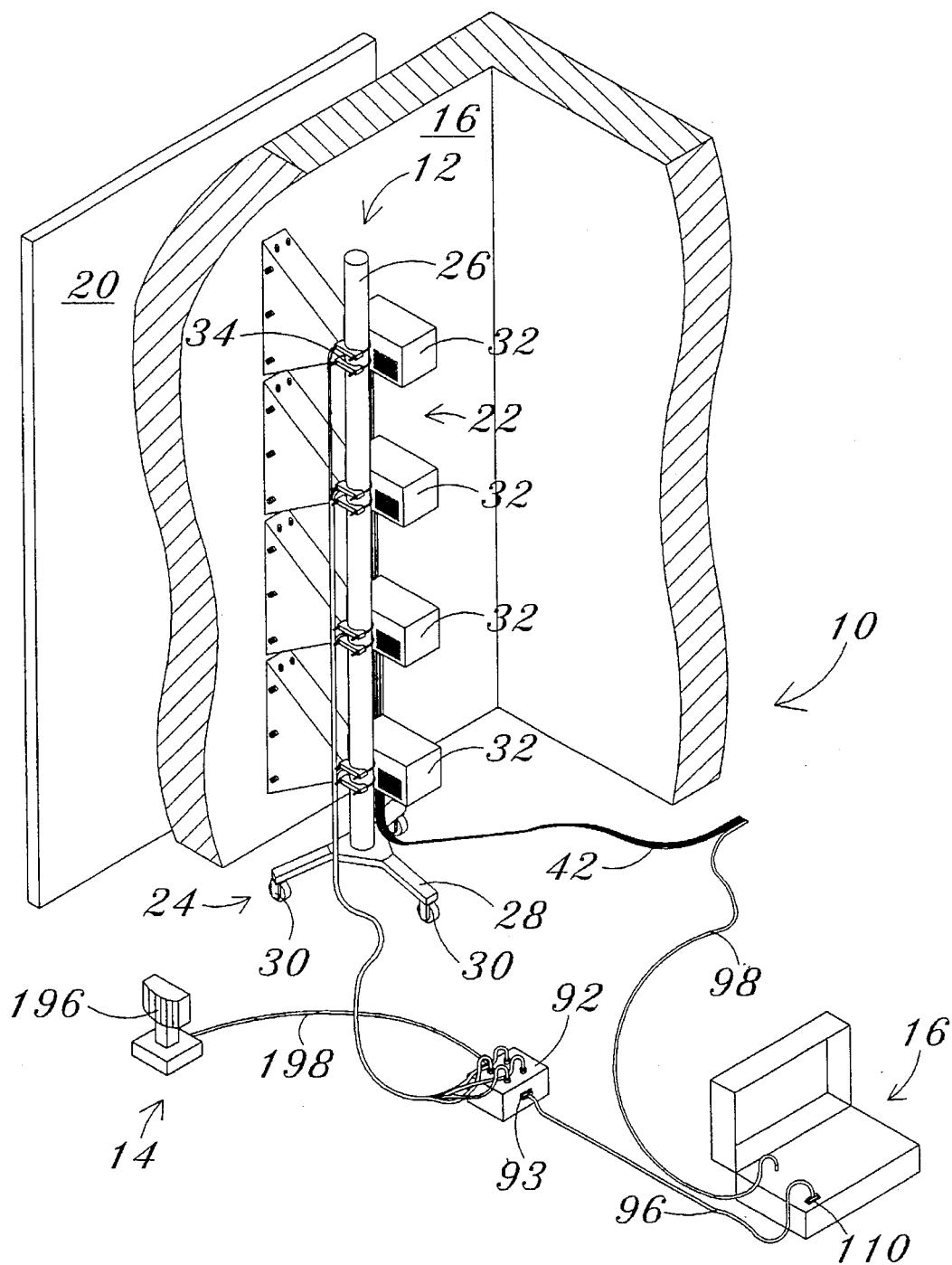
FIG. 1 is an isometric view of the preferred embodiment of the present invention.

The best presently known mode for carrying out the invention is an in situ microwave insect eradication system and is illustrated in an isometric view in FIG. 1 and is designated therein by the general reference character 10. The eradication system 10 can be envisioned as being comprised of a number of different components, including a horn array subassembly 12, a proximity detector subsystem 14, and a local control unit 16. In the view presented in FIG. 1, the horn array subassembly 12 is depicted on one side of a wall 18. On the other side of the wall is an energy absorbent backdrop 20.

As shown in FIG. 1 the horn array subassembly 12 includes a first movable pole assembly 22 having a base member 24 with a vertical pole 26 extending upward therefrom. The base member 24 is well known in the art and includes a number of foot members 28 that terminate in rotatable wheel units 30, allowing the first movable pole assembly 22 to be rolled in any direction. As shown in FIG. 1, the pole 26 is rigid and cylindrical in design.

In the preferred embodiment 10 the movable pole assembly 22 supports a number of identical microwave horn units 32 arranged in a vertical array. As shown in FIG. 1 and as best shown FIG. 2 each microwave horn unit 32 includes a pole clamp 34 securing the microwave horn unit 32 to the first movable pole assembly 22.

One skilled in the art would recognize that a number of different structures can be used as substitutes for the first movable pole assembly 22. Such substitute structures would simply require an upwardly extending member to which the microwave horn units 32 could attach. While the wheeled base member 24 provides great convenience, such a design is not necessary for the present invention 10.

Figure 2:
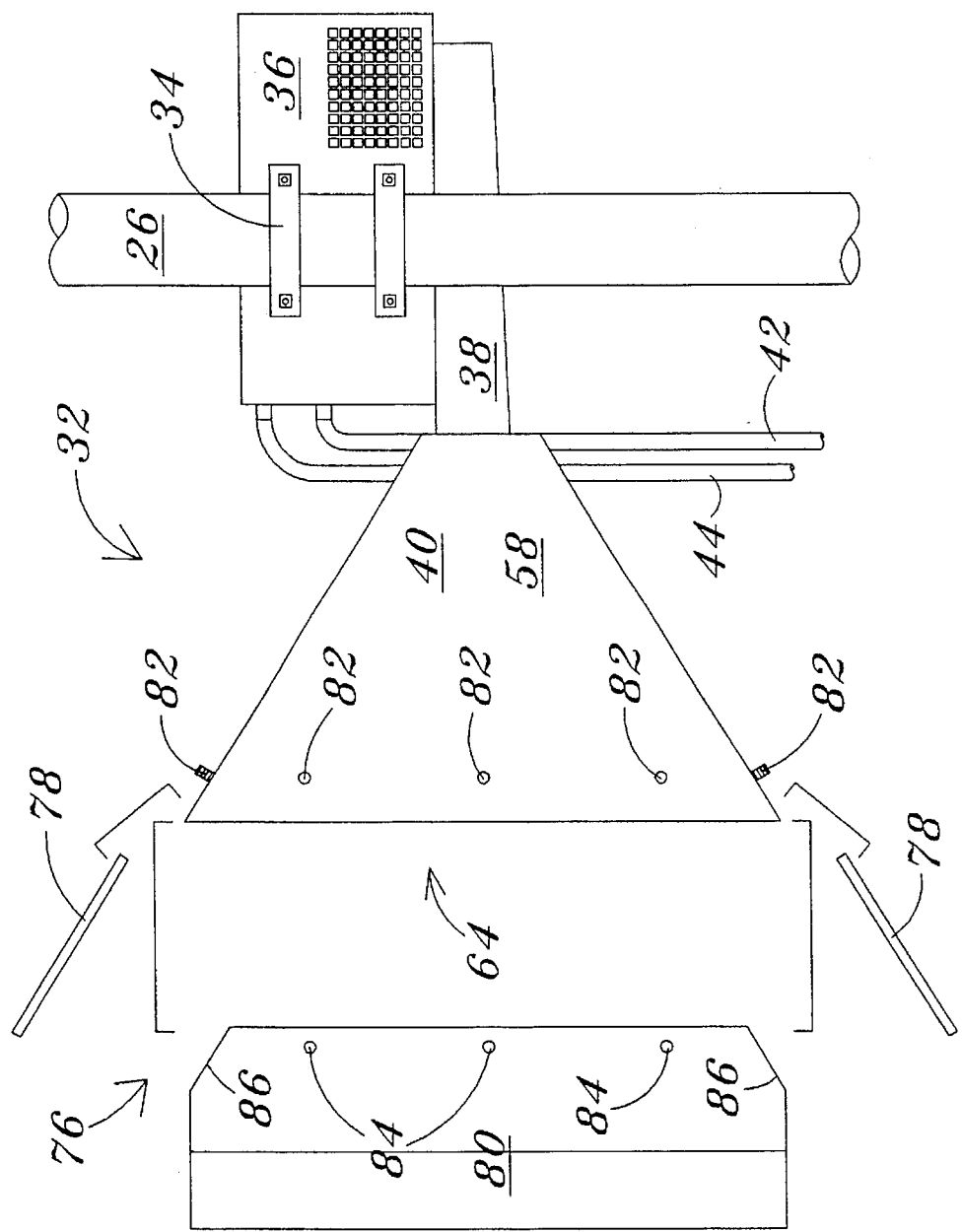
FIG. 2 is a side view of a microwave horn unit of the preferred embodiment.

As mentioned previously, the microwave horn units 32 of the preferred embodiment 10 are identical, and for that reason only one will be discussed in detail herein. As shown in FIG. 2, each microwave horn unit 32 has a control box 36, a waveguide portion 38, and a launcher portion 40. An ac power cord 42 and a coaxial control cable 44 are connected to the control box 36. As shown in the cross section of FIG. 3, the control box 36 includes a magnetron control circuit 46 and a horn unit power supply 48. In addition, a magnetron 50 extends downward from the control box 36 into the waveguide portion 38. In the preferred embodiment 10, the ac power cord 42 provides 110 volts ac line voltage to the horn unit power supply 48. The horn unit power supply 48 in turn includes a transformer 52 and a rectifier 54 to step up the line voltage and provide 5,000 volts dc to the magnetron 50. In the preferred embodiment 10 the magnetron 50 unit emits approximately 2000 Watts of energy. The magnetron control circuit 46 ensures that line voltage is applied to the horn unit power supply 48 only when a control signal 56 is present on the control cable 44. In the preferred embodiment 10, the magnetron control circuit 46 includes two inputs. In order for the magnetron control circuit 46 to activate the magnetron, a first input must be at ground, and a second input must be at 12 Vdc. Any other input signal configuration will result in the magnetron being shut off. As will be discussed later, the control signal 56 is generated by the local control unit 16.

Figure 4:
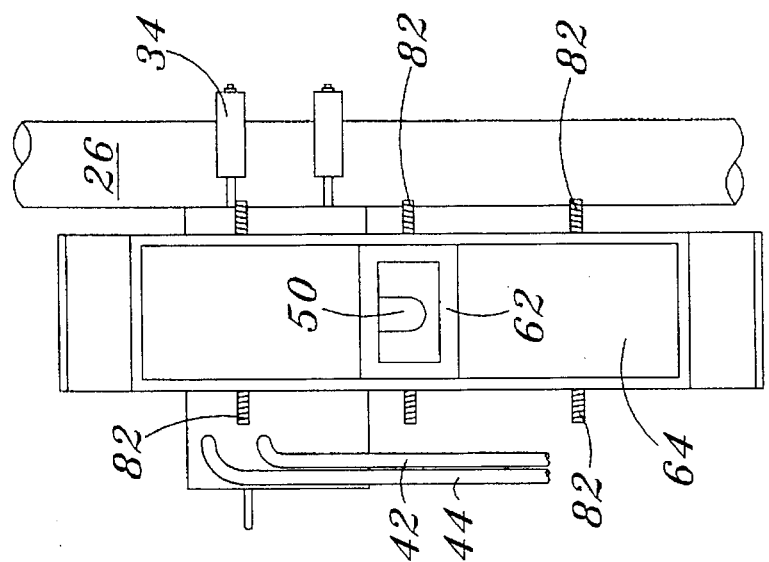
FIG. 4 is a front view of a microwave horn unit of the preferred embodiment.
Figure 3:
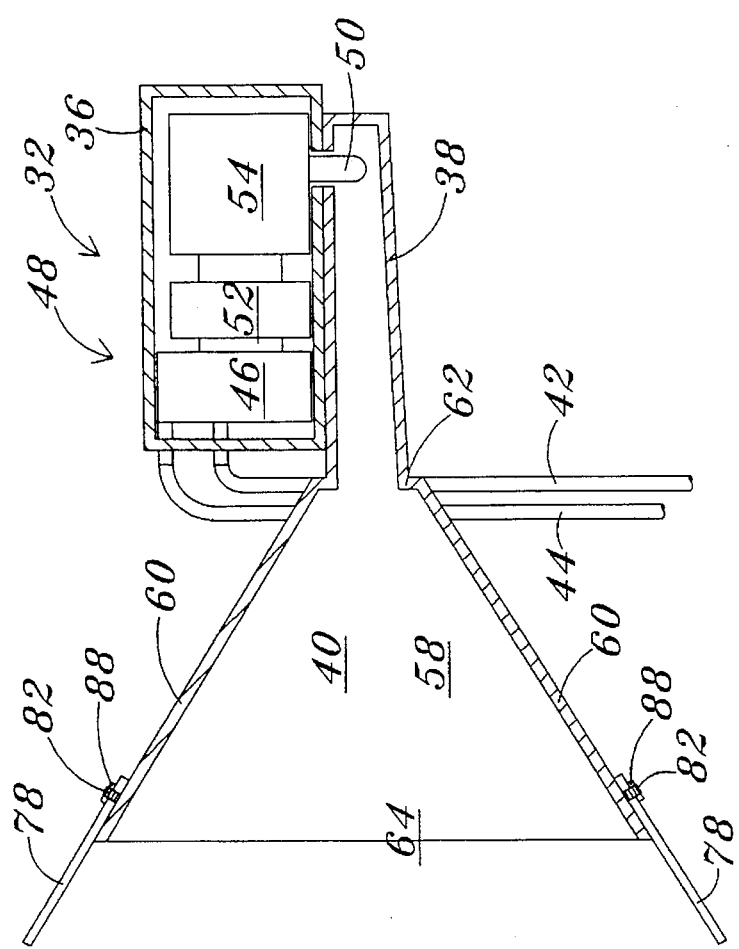
FIG. 3 is side cross sectional view of a microwave horn unit of the preferred embodiment.

The high frequency field emitted by the magnetron 50 is coupled to the waveguide portion 38 and propagates to the launcher portion 40. The waveguide portion 38 is a generally rectangular, hollow waveguide that opens into the launcher portion 40. As is shown in FIGS. 1–3, and the front view of FIG. 4, the launcher portion 40 includes two identical, parallel, trapezoidal side walls 58, two slope walls 60, and a rear wall 62. The two slope walls 60 connect opposing sloping edges of the trapezoidal side walls 58. The slope walls 60 and trapezoidal side walls 58 terminate at one end in the rear wall 62, and at the other end in a horn opening 64. As best shown in FIGS. 3 and 4, the waveguide portion 38 opens into the rear wall 62 of the launcher portion 40. The launcher portion 40 directs the microwave energy generated by the magnetron 50 out of the horn opening 64.

While FIG. 1 illustrates a vertical array of microwave horn units 32, the horn array subassembly 12 also includes additional equipment for deploying the microwave horn units 32 in a horizontal array. Such a configuration is set forth in FIG. 5. In the preferred embodiment 10, the additional equipment includes a second movable pole assembly 66 and a bar member 68. The second movable pole assembly 66 is identical to the first movable pole assembly 22 and so will not be discussed in any more detail herein. The bar member 68 has a first bar end 70 and a second bar end 72. Each bar end (70 and 72) terminates in a clamping unit 74. Like the pole clamps 34 of the microwave horn units 32, the clamping units 74 are designed to clasp the poles 26 of the movable pole assemblies (22 and 66). As set forth in FIG. 5, the bar member 68 is attached horizontally to the first and second movable pole assemblies (22 and 66) by the clamping units 74. The microwave horn units 32 can then be attached to the bar member 68 to form a horizontal array as shown in FIG. 5. One skilled in the art would understand the number and orientation of microwave horn units 32 is dependent on the object or area sought to be treated, i.e. three or less microwave horn units 32 could be deployed for a smaller area, or more than four microwave horn units 32 could be deployed for larger areas. In addition, more than one row of microwave horn units 32 could be employed accordingly.

The preferred embodiment 10 also includes a number of launcher attachments 76 for further directing microwave energy emitted from the microwave horn units 32. The launcher attachments 76 are illustrated in FIGS. 2 and 3 and include slope wall plates 78 and side wall plates 80. In the view of FIG. 2, one side wall plate 80 and two slope wall plates 80 are shown adjacent and unattached to the launcher portion 40. FIG. 3 shows the slope wall plates 78 connected to the launcher portion 40. As illustrated in the FIGS. 2 and 4, the trapezoidal side walls 58 each include three threaded, outward extending attachment posts 82. Each side wall plate 80 includes three attachment apertures 84 for receiving the attachment posts 82, and two sloped corners 86 to provide a shape that matches the trapezoidal side wall 58 as it overlaps. The side wall plate 80 can be secured to the launcher portion 40 by three nuts 88 so that the side wall plate 80 functions as a parallel extension of the trapezoidal side wall 58. The side wall plates 80 are bent toward the horn opening 64, and are particularly useful for treating door jams. The microwave horn 32 is placed against a door jam with the side wall plates 80 surrounding the door jam. This arrangement concentrates the emitted energy into the door jam. Similar to the side wall plates 80, the slope wall plates 78 can be attached to the slope walls 60 by way of two threaded attachment posts 82 that extend through two attachment apertures 84 in the slope wall plates 78, and two corresponding nuts 88. The slope wall plates 78 are particularly useful for treating corners and mud sills. It is understood that the launcher attachments 76 are used to further direct the emitted microwave energy. Thus as many as two side wall or slope wall plates (80 and 78) can be used per microwave horn unit 32, or none at all, as in the example of FIG. 1, according the desired direction of the microwave energy.

The horn array subassembly 12 of the preferred embodiment 10 is positioned adjacent to the area to be treated. In the example illustrated in FIG. 1, the horn array subassembly 12 is situated adjacent to the wall 18. The horn array subassembly 12 is intended to be a deployed away from the local control unit 16. In this aspect, the horn array subassembly 12 is considered as a "remote" component herein. This arrangement has distinct safety advantages because it situates the high voltage equipment away from an operator manning the local control unit subassembly 16.

As illustrated in FIG. 1, a junction box 92 is connected to the proximity detector subsystem 14 and the four control cables 44 of the microwave horn units 32. The junction box 92 includes a 15 pin junction connector 93 that is electrically connected to the control cables 44 and the proximity detector subsystem 14. As shown in the figure, the junction box 92 provides an intermediate connection between both the proximity detector subsystem 14 and the local control unit 16, and the microwave horn units 32 and the local control unit 16.

Figure 6:
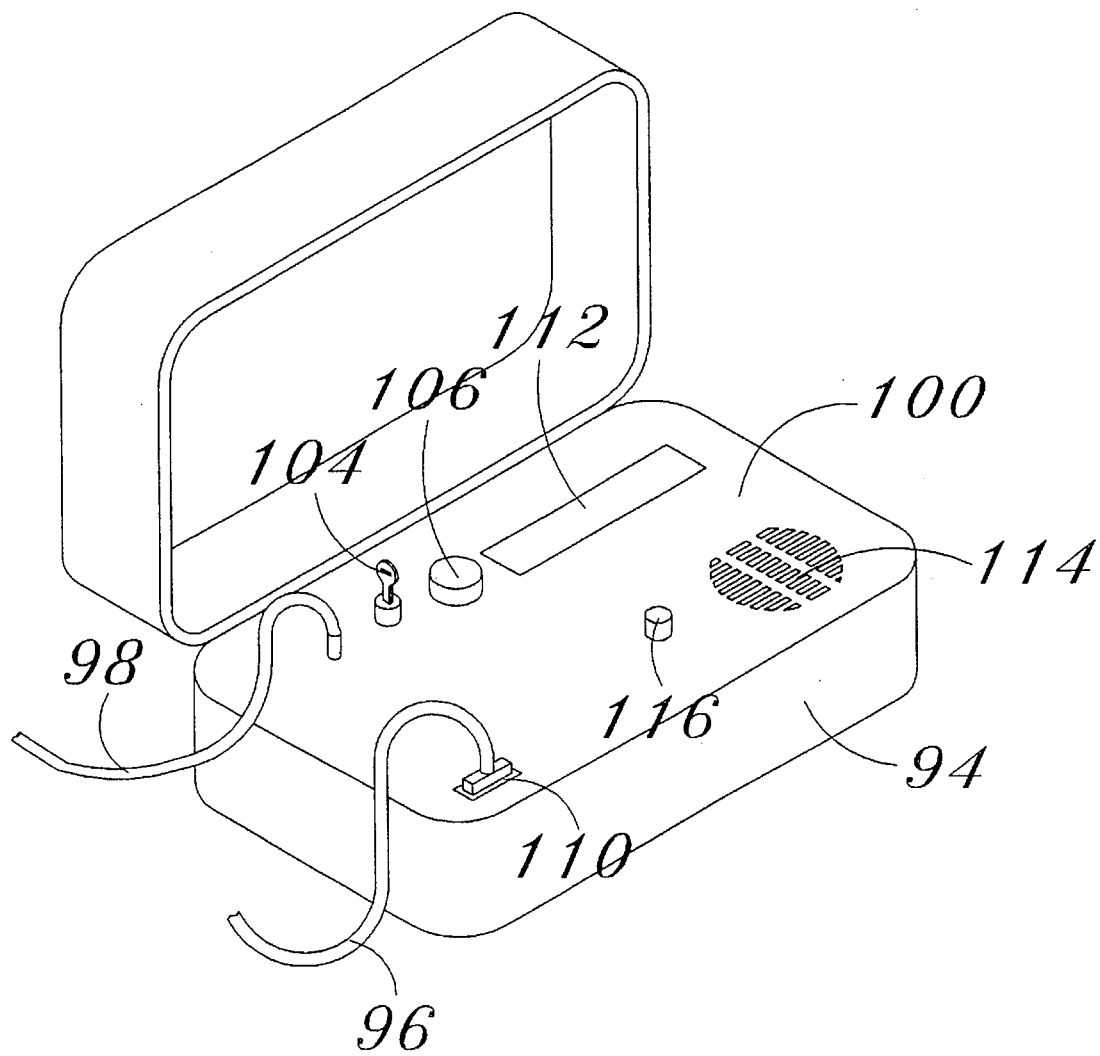
FIG. 6 is an isometric view of the local control unit of the preferred embodiment.

The local control unit 16, as mentioned previously, is operated at a distance from the horn array subassembly 12, and is set forth in more detail in FIG. 6. As shown in the figure, in the preferred embodiment 10, the local control subsystem 16 includes a suitcase unit 94, a 15 pin cable 96, and a power cable 98. The suitcase unit 94 houses the various control components of the local control unit 16. The suitcase unit 94 is lockable, and constructed of a rigid material to provide protection for the components housed therein. The suitcase unit 94 opens to display a control panel 100 which contains a keylock switch 104, a start/stop button 106, a 15 pin panel connector 110, a digital display 112, a speaker 114, and a volume control knob 116. The 15 pin cable 96 connects the junction connector 93 of the junction box 92 with the panel connector of the local control unit 16.

Figure 7:
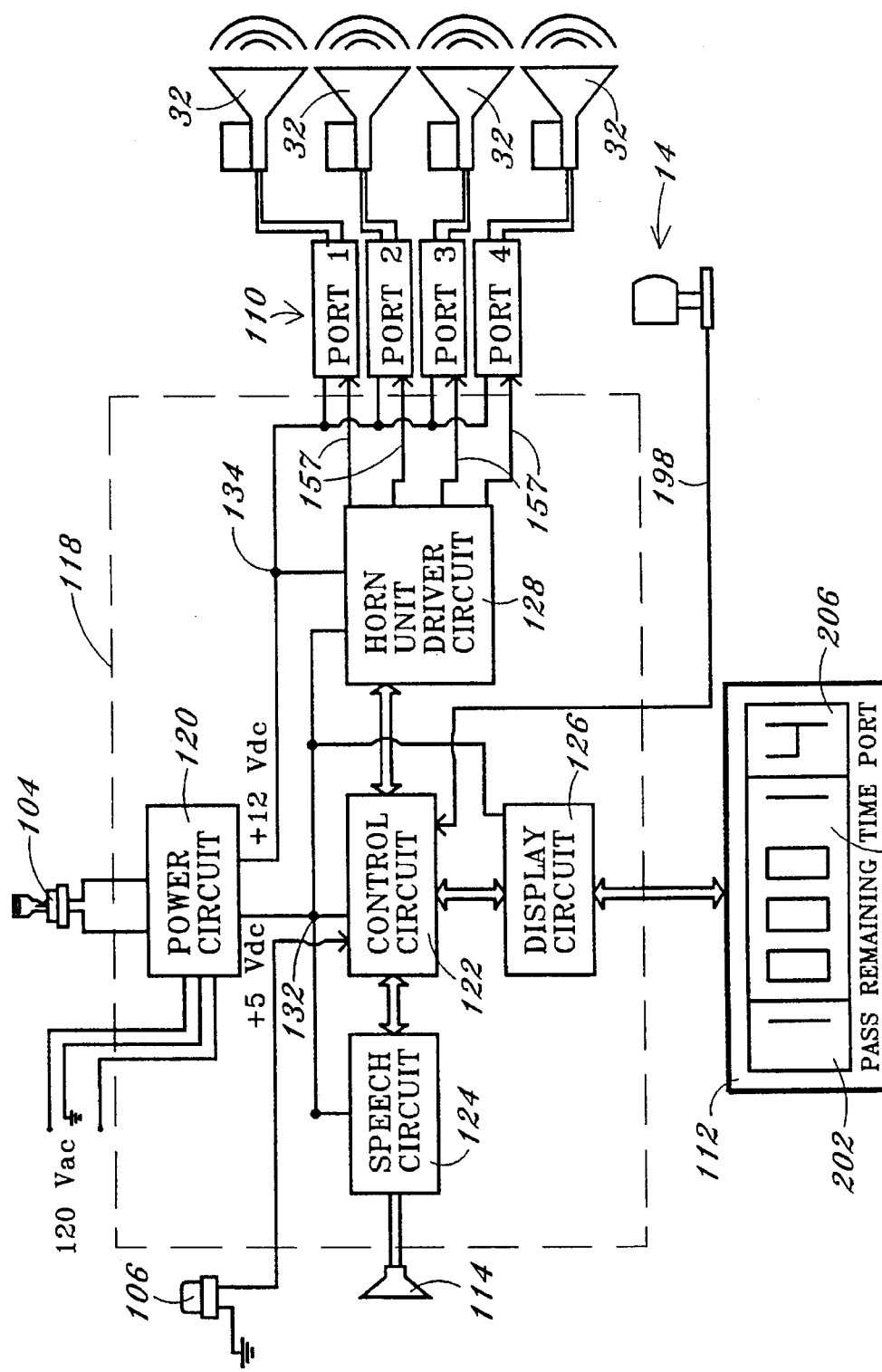
FIG. 7 is a block diagram of the control subsystem of the preferred embodiment.

The local control unit 16 of the preferred embodiment 10 houses a control subsystem 118 which contains a number of interconnected circuits. The control subsystem 118 is illustrated in FIG. 7 and includes a power circuit 120, a control circuit 122, a speech circuit 124, a display circuit 126, and a horn unit driver circuit 128. In the preferred embodiment 10, all of the above mentioned circuits are physically contained within the suitcase unit 94.

Referring now to FIG. 7, to aid in understanding the operation of the control subsystem 118, various physical components are fancifully represented to illustrate their relationship to the control subsystem 118. The keylock switch 104, the start/stop button 106, the speaker 114, the digital display 112, proximity detector subsystem 14, the 15 pin cable 110, and the microwave horn units 32 are all graphically depicted. One skilled the art would recognize that the connection between the proximity detector subsystem 14 and the microwave horn units 32 is via the junction box 92 and 15 pin cable 110.

The keylock switch 104 and 120 Vac are shown connected to the power circuit 120. The 120 Vac is provided by the power cable 98 as shown in FIG. 6. The power circuit 188 in turn converts the 120 Vac into two dc voltages, providing a +5 Vdc node 132 for the various integrated circuits in the control subsystem 118, and a +12 Vdc node 134 for the horn unit driver circuit 126 and the coaxial output ports 110.

As depicted in FIG. 7, the control circuit 122 receives a number of inputs and supplies a number outputs. Inputs are indicated by arrows going into the control circuit 122 while outputs are correspondingly shown as arrows directed away from the control circuit 122. The start/stop switch 106, and the proximity detector subsystem 14 provide inputs, while the control circuit 122 generates output signals for the speech circuit 124, the display circuit 126, and the horn unit driver circuit 128.

The speech circuit 124 drives the speaker 114 and the display circuit 126 drives the digital display 112. As is shown in FIG. 7 the horn unit driver circuit provides an output signal for each microwave horn unit 32.

The power circuit 120 of the preferred embodiment 10 is set forth in detail in FIG. 8. As is illustrated in the figure, the power circuit 120 receives ac voltage across power input terminals 136 which is coupled to a control transformer 138. As illustrated in the schematic, a fuse 140 and the keylock switch 104 are interposed between the input terminals 136 and the control transformer 138. The control transformer 138 and a control rectifier 142 create a dc voltage which is coupled to a first dc-to-dc converter 144. The output of the first dc-to-dc converter 144 is coupled to a second dc-to-dc converter 146. In the preferred embodiment 10, the first dc-to-dc converter 144 creates the +12 Vdc node 134, and the second de-to-de converter 146 creates the +5 Vdc node 132. The position of the keylock switch 104 within the power circuit 118 ensures that the control subsystem 118, and consequently the microwave horn units 32, are entirely inoperable without the keylock switch 104 being closed. It follows that the eradication system 10 can be immediately disabled by opening the keylock switch 104. This provides a simple disabling apparatus which adds to the safety of the present invention 10.

The control circuit 122 of the preferred embodiment 10, is illustrated in FIG. 9 and centered around a microprocessor 148. Accompanying the microprocessor 148 is nonvolatile memory 150 and a clock 152. In the preferred embodiment 10 the nonvolatile memory 148 is in the form of an electrically erasable and programmable read only memory (EEPROM). The EEPROM contains all the programming and default data for the microprocessor 148. As shown in FIGS. 7 and 9, the start/stop button 106 provides a start/stop input 154 to the microprocessor 148. Upon start-up, the microprocessor 148 is programmed to watch the start/stop input 154 in the event it goes low. When the start/stop button 106 is activated (goes low) the microprocessor 148 begins to count, and after a preprogrammed time period passes (10 second in the preferred embodiment 10), the microprocessor 148 begins eradication operation by outputting start signals 156 from a number of start signal outputs 157 that are coupled to the horn unit driver circuit 128. After the start signals 156 are generated, the microprocessor 148 continues to monitor the start/stop input 154. In the event the start/stop input 154 goes low a second time (indicating a second operation of the start/stop switch 106) the start signals 156 are disabled. Unlike the start operation, the stop operation is immediate, and does not require ten seconds of contact. The use of the ten second delay in activation of the eradication system 10 provides distinct safety advantages. It eliminates the possibility that the microwave horn units 32 are activated by incidental contact to the start/stop switch 106 and enables an operator of the eradication system 10 to survey the operational area prior to activation of the microwave horn units 32.

As shown in FIG. 9, in the preferred embodiment 10, there are four start signal outputs 157. The start signal outputs 157, as best shown in FIG. 7, correspond to the four microwave horn units 32. The number, duration, order and repetition of the start signals 156 transmitted from the start signal outputs 157 are programmable, and in the preferred embodiment 10, are stored in the nonvolatile memory 150. One skilled in the art would recognize that this type of data could also be input via an input device such as a keyboard or combination of knobs and switches. In addition, it is also understood a number of different programs could be stored and subsequently recalled. The combination of the nonvolatile memory (EEPROM) and microprocessor of the preferred embodiment should not be read as limiting. Among the many alternate designs are more sophisticated systems, such as laptop computers or the like. Alternatively, less sophisticated systems, such as a circuit employing programmable logic array with or without timer circuits could also be employed.

In addition to the start/stop input 154, the microprocessor 148 also monitors a proximity detector input 160. In the event the proximity detector input 160 is low, the microprocessor 148 is interrupted and its operation is reset. This configuration allows the proximity detector subsystem 14 to automatically disable any start signals 156, and ensures that no power can be applied to the microwave horn units 32 if the proximity detector subsystem 14 is activated.

Once the microprocessor 148 begins eradication operation, in addition to outputting the start signals 156, the microprocessor 148 also outputs speech output signals 162 and display output signals 164 which correspond to the various steps in the eradication operation. The speech output signals are transmitted to the speech circuit 124. The speech circuit 124 is illustrated in FIG. 10, and in the preferred embodiment 10, includes a digital storage unit 166, a digital-to-analog converter (DAC) 168, a filter 170, and an audio amplifier 172 which provides an audio output 174. The volume control knob 116 is a potentiometer in the audio amplifier 172 which operates to adjust the audio output 174 of the audio amplifier circuit 172. As is illustrated in FIG. 7, the audio output 174 is connected to the speaker 114. The digital storage unit 166 contains a number of different voice articulations stored in digital form. These voice articulations are selected according to the speech output signals 162 received from the microprocessor 148, and subsequently transmitted to the DAC 168. Using conventional methods, the analog DAC output 176 is filtered and amplified so that the voice articulations are audible to an operator as they are output by the speaker 114.

The display driver circuit 126 of the preferred embodiment 10, is entirely conventional in design and so is not set forth detail. According to instructions from the microprocessor 148 a variety of display signals are transmitted to a display driver, which in turn drives the digital display 112 on the control panel 100, as is shown in FIG. 7. In the preferred embodiment 10, the pass number, coaxial output port number, and remaining time are displayed. These aspects of operation will be discussed in more detail when the operation of the preferred embodiment 10 is set forth below. It is understood that the use of a digital display 112 and should not be read as limiting. Among the many display variations would be the use of a flat panel display, a liquid crystal display, or even analog gauges. In addition, any number of other operating parameters could be displayed, including but not limited to magnetron power or proximity detector subsystem power.

Figure 11:
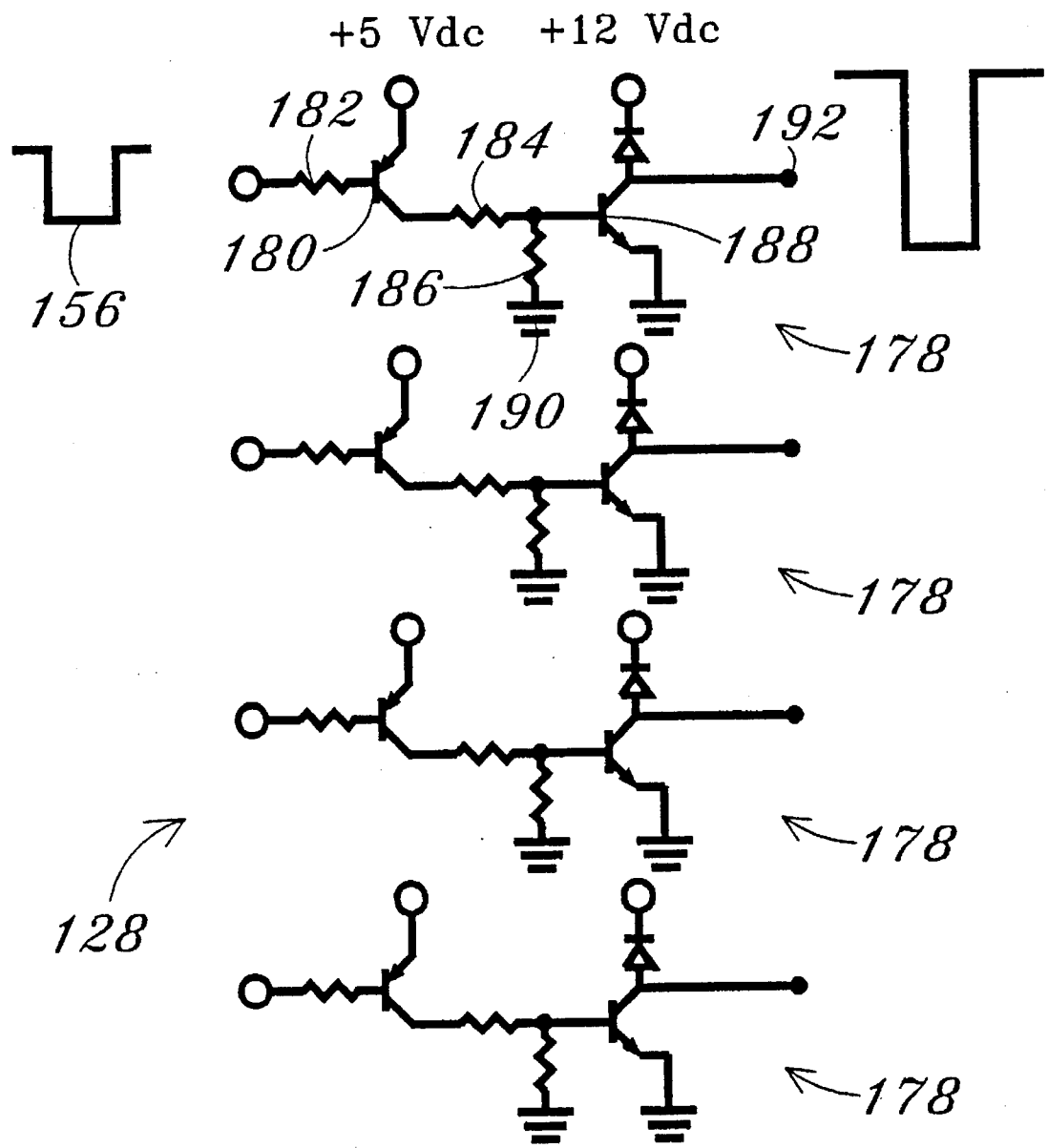
FIG. 11 is schematic diagram of the horn trait driver circuit.

The horn driver circuit 128 of the preferred embodiment 10 is set forth in detail in FIG. 11. The figure illustrates four identical driver channels 178 corresponding to the four microwave horn units 32. Each channel receives a separate start signal 156 from the microprocessor 148. As each driver channel 178 is identical, only one driver channel 178 will be discussed in detail. As is shown in the figure, each driver channel 148 includes a pnp bipolar transistor 180, the pnp base being connected to the microprocessor 148 to receive the start signal 156 via a first series resistor 182. The pnp emitter is coupled to the +5 Vdc node 132 and the pnp collector is coupled through a second series resistor 184 to both an npn transistor 188 base and a parallel resistor 186 connected to ground 190. The npn emitter is connected to ground 190 and the npn collector provides a channel output 192, and is connected to the +12 Vdc node 134 through a diode 194.

In the preferred embodiment 10, upon start-up or reset, the microprocessor 148 start signals 156 are normally high, and the pnp transistor 180 is off. Upon beginning eradication operation the start signal 156 drops low, turning on the pnp transistor 180, which drives current through the parallel resistor 186, turning on the npn transistor 188. Once turned on, the npn transistor 188 brings the channel output 192 down to 0 Vdc. The drop on the channel output 192 is coupled through the 15 pin cable 96, the junction box 92, and the control cable 44 to the magnetron control circuit 46, where the drop in voltage is the control signal 56 which turns on the magnetron 50. As mentioned previously, in order for the magnetron 50 to turn on, the magnetron control circuit 46 must receive a corresponding +12 Vdc signal in addition to 0 Vdc signal on the channel output 192. As is illustrated in FIG. 7, this +12 Vdc signal is provided by the +12 Vdc node and, like the channel output 192, is coupled to the magnetron control circuit 46 via the 15 pin cable 96, junction box 92 and corresponding control cable 44. The horn unit driver circuit 128 ensures that failure of the power circuit 120, including either dc-to-dc converter (144 and 146), will result in failure of the horn driver circuit 128.

As is shown in FIGS. 1 and 7, the preferred embodiment 10 also includes the proximity detector subsystem 14 including a number of proximity detectors 196 connected to the local control unit 16 by a detector cable 198. The operation of proximity detectors 196 is well known in the art and so will not be discussed in detail herein. All that is required for the present invention 10 is that the proximity detectors 196 each output a detect signal 200, as shown in FIG. 9, upon detecting an object. In the preferred embodiment 10, the proximity detectors 196 are infrared detectors sensitive enough to detect small animals, such as cats and dogs. Each proximity detector 196 is connected to the local control unit 16 via the detector cable 198, junction box 92, and 15 pin cable 96, to transmit the detect signal 200 to the detector input 160 of the microprocessor 148. If more than one detector 196 is employed, the detector signals 200 are summed, and in the event the microprocessor 148 receives a detect signal 200 from any of the proximity detectors 196, the microprocessor 148 operation is reset, disabling any start signal 156 from being transmitted to the horn unit driver circuit 128. This aspect of the present invention 10 provides additional safety by ensuring that no microwave energy can be emitted if a body is within detectable range of any of the proximity detectors 196.

As illustrated in FIG. 1 the present invention also employs the energy absorbent backdrop 20. The backdrop 20 is designed to absorb any microwave energy not absorbed by the treated area. In the example illustrated in FIG. 1, the backdrop 20 is attached to the wall 18 on the side opposite the horn array subassembly 12. In the preferred embodiment 10, the backdrop 20 is composed of carbon treated antistatic foam.

Various modifications may be made to the invention without altering its value or scope. All of the above are only some of the examples of available embodiments of the present invention. Those skilled in the art will readily observe that numerous other modifications and alterations may be made without departing from the spirit and scope of the invention. Accordingly, the above disclosure is not intended as limiting and the appended claims are to be interpreted as encompassing the entire scope of the invention.

INDUSTRIAL APPLICABILITY

The in situ microwave eradication system 10 of the present invention is intended to be widely used in the extermination of termites. Once the presence of the pests is detected the eradication system 10 can be deployed. One distinct advantage of the eradication system 10 is the versatility of the horn array subsystem 12. The microwave horn units 32 can be arrayed to treat only the wooden areas of a structure (vertical studs for example).

Once the present invention 10 is deployed, the operating procedure for the preferred embodiment 10 can be undertaken. The operating procedure begins by turning the keylock switch 104 to provide power to the local control unit 16. The start/stop button 106 is depressed and held for ten seconds. During the ten second hold time the operator can scan the area. If at any time the start/stop 106 button is released, operation is reset, requiring the button be depressed for another ten seconds to begin eradication operation. After the start/stop button 106 has been engaged for ten seconds, the microprocessor 148 will begin eradication operation and engage the microwave horn units 32. Once the microwave horn traits 32 are engaged the speech circuit 124 will emit an audio indication through the speaker 114 that will continue until the eradication operation ceases.

At the same time the audio indication is provided, the digital display 112 presents a second means for following the operation of the eradication system 10. As illustrated in FIG. 7, the digital display 112 presents three fields; a "pass" field 202, a "remaining time" field 204, and a "port" field 206. Once eradication operation begins, the digital display 112 provides a pass number at the "pass" field 202. The pass number begins with zero and will rise incrementally in the event the microprocessor 148 has been programmed to apply microwave energy more than one time in the eradication operation. The "remaining time" field 204 presents a predetermined time amount indicating the duration of the eradication operation. In the preferred embodiment 10, this is presented in minutes and seconds. The time amount counts down as the eradication operation proceeds until, upon reaching zero, the eradication operation ceases. The "port" field 206 indicates which microwave horn unit 32 is currently engaged (i.e. 1–4). As the eradication operation switches between different microwave horn units 32, the number displayed in the "port" field 206 will follow correspondingly.

The eradication system 10 is not intended to be used for termites only, however. Any number of pests can be exterminated with the present system. One of the many such applications would be treating lumber to kill unwanted pests residing therein. This application is particularly useful for lumber imported from areas containing unwanted pests. Temperature, duration, repetition and even frequency of the microwave energy can be tailored for particular pests. The inventors of the present system 10 have found that for termites the most effective method involves placing the 2500 Watt microwave horn units as close as possible to the intended target object, and applying energy at a frequency of about 2450 MHz. The amount of time the energy is applied varies according to material type and thickness.

The eradication system 10 of the present invention may be utilized in any application where conventional extermination means are used. It provides a less intrusive, and safer alternative to chemical methods.

Since the eradication system 10 of the present invention may be readily constructed and may be adapted for use with existing computer equipment and other existing peripheral devices it is expected that it will be acceptable in the industry as an effective alternative present methods. For these and other reasons, it is expected that the utility and industrial applicability of the invention will be both significant in scope and long-lasting in duration.

What is claimed is:

1. A pest eradication system utilizing microwave energy, comprising:

a plurality of remote magnetron units, each magnetron unit having a magnetron for emitting microwave energy and a horn for directing emitted microwave energy;

power source means for providing power to each said magnetron unit;

a single local control unit for controlling power to all of said magnetron units such that said magnetron units may be activated by an operator at a safe distance;

a contact delay switch for providing that the power to each said magnetron unit is not instantaneously supplied but rather is delayed for at least several seconds upon attempted activation of said magnetron units from said local control unit;

at least one proximity sensor for detecting bodies near said magnetron units, said proximity sensor emitting an off sisal upon detecting a body; and a power control circuit for disengaging power to said magnetron units upon receiving an off signal from said proximity sensor.

2. The pest eradication system of claim 1 wherein:

said power source means includes one power supply integral to each said magnetron unit.

3. The pest eradication system of claim 2 wherein:

each power supply includes transformer means for stepping up a line voltage to a dc plate voltage for each said magnetron.

4. The pest eradication system of claim 1 wherein:

the horn of each said magnetron unit includes
- a waveguide portion having a terminated end for receiving the magnetron and an opposing open transmission end;
- a generally cone shaped launcher having a small aperture and a large aperture, the small aperture being connected to the transmission end.

5. The pest eradication system of claim 1, further including:

a mounting subsystem for mounting said magnetron units, said mounting subsystem including one or more portable pole structures, each portable pole structure including a wheeled base member and a vertically extending member; and each said magnetron unit includes clamp means to engage the vertically extending member and create a vertically disposed array of magnetron units.

6. The pest eradication system of claim 5 wherein:

said mounting subsystem includes two or more portable pole structures and further includes one or more bar members and a plurality of bar couplers, said bar couplers connecting one or more bars in a horizontal orientation between two pole structures; wherein the clamp means of each magnetron unit can engage one or more said bar members and create a horizontally disposed array of magnetron units.

7. The pest eradication system of claim 1 wherein:

each said magnetron unit includes power switch means for applying power to the magnetron, the power switch means being activated by a control signal; and said local control unit generates the control signals and includes cabling for carrying said control signal to the power switch means.

8. The pest eradication system of claim 1 wherein:

said local control unit includes audio indicator means for indicating the operation of said local control unit.

9. The pest eradication system of claim 1 wherein:

said local control unit includes display means for displaying operating parameters of said local control unit.

10. The pest eradication system of claim 1 further including:

a microwave energy absorbing back drop, said back drop being positioned opposite the horn of said magnetron units to absorb the energy directed therefrom.

11. A system for eradicating insects from an object comprising:

at least one microwave horn array, said array including a mount rack and at least one microwave horn for emitting microwave energy;

programmable means for programming the order, duration, and repetition of the microwave energy emitted from the microwave horns;

remote-control means for activating and controlling the microwave horns at a safe distance from an operator;

delay switch means for providing that power to the microwave horns is not instantaneously supplied upon activation of a start/stop means but rather is delayed for at least several seconds, the start/stop means being associated with said remote-control means; and sensor means for detecting bodies in the proximity of the microwave horns and for deactivating the microwave horns upon such detection.

12. The system of claim 12 further including:

a local, low voltage power supply means;

output driver means for activating the microwave horn upon receiving a control signal, said output driver means being powered by said low voltage power supply means; and said programmable means provides a control signal to said output driver means for the microwave horn.

13. A microwave horn unit for emitting microwave energy comprising:

a waveguide for propagating microwave energy, said waveguide having a transmission opening and magnetron opening;

a launcher portion having an input aperture and output aperture, the input aperture having the same dimensions of the transmission opening, the output aperture being greater in dimension than the input aperture, the input aperture being coupled to the transmission opening;

a magnetron power supply for providing plate voltage to a magnetron said magnetron power supply being controllable by a remote control signal;

a magnetron for receiving plate voltage and emitting microwave energy, the magnetron depending into said waveguide through the magnetron opening;

a time delay contact switch for preventing inadvertent activation of said magnetron power supply;

at least one proximity, sensor for detecting bodies near said magnetron, said proximity sensor emitting an off signal upon detecting a body; and a power control circuit for deactivating said magnetron power supply upon receiving an off sisal from said proximity sensor.

14. The microwave horn unit of claim 13 wherein:

the launcher portion includes a first side, and an opposing a second side, the first side and second side being trapezoidal in shape and having a short edge, a long edge, and two sloped edges, the short edges being connected to the transmission opening of the waveguide, the launcher further including a third side and a fourth side connecting the sloped edges of first and second sides, the sides forming the output aperture which is generally rectangular in shape.

15. The microwave horn unit of claim 14 further including:

extension attachment means on at least one of the sides;

at least one horn extension attachment for guiding microwave energy emitted from the output aperture, the horn extension attachment being a rigid, member attached to one of the sides of the launcher portion by said extension attachment means.

16. The microwave horn unit of claim 13 wherein:

the waveguide is a hollow, generally rectangular waveguide.

17. The microwave horn unit of claim 13 wherein:

said proximity sensor is an infrared proximity detector.

* * * * *